No. 760,894. PATENTED MAY 24, 1904.
C. F. C. MEHLIG.
FLEXIBLE SHAFT COUPLING.
APPLICATION FILED AUG. 12, 1902.
NO MODEL.
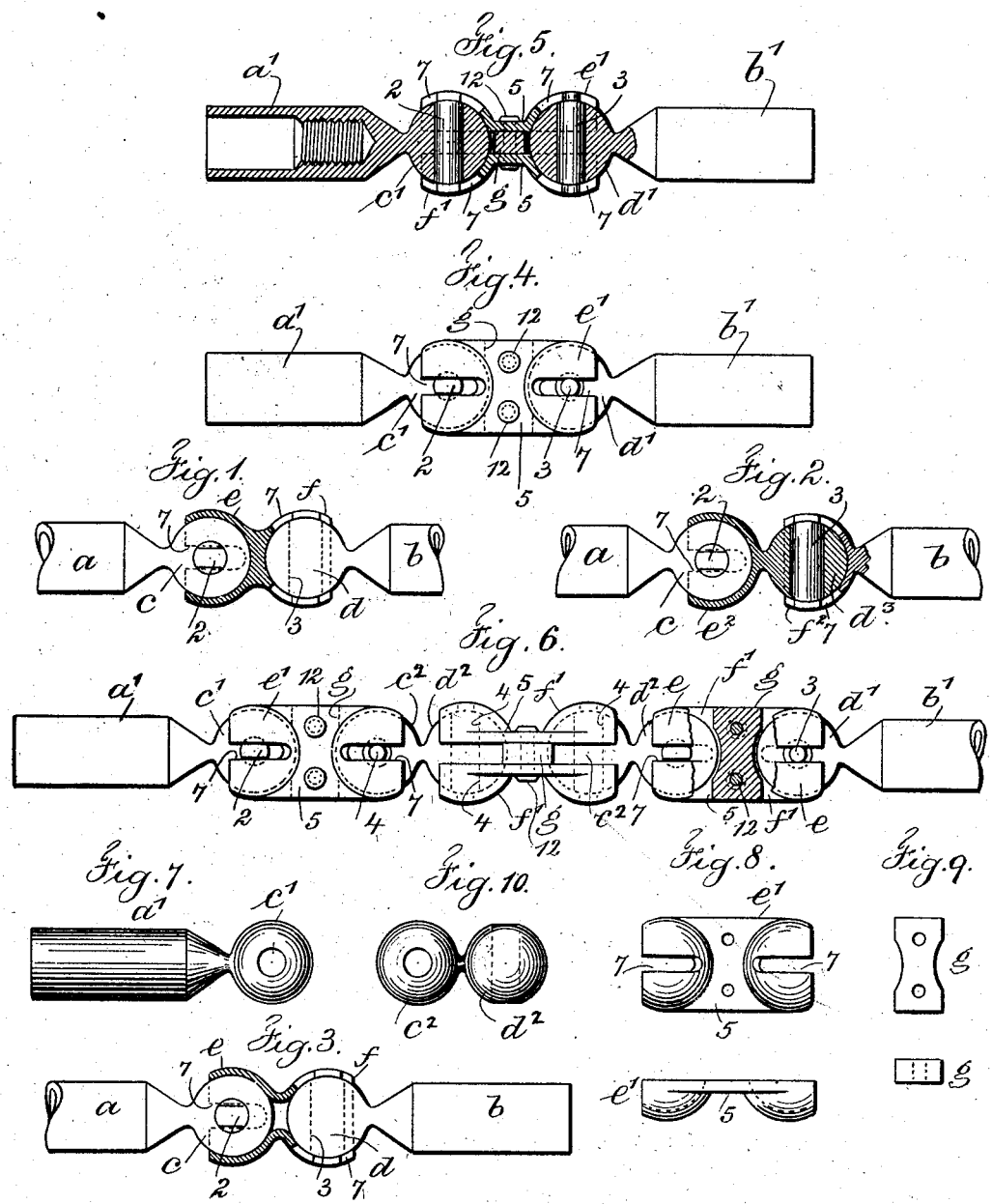
Witnesses
Chas H. Smith
J. Staib
Inventor
Charles F. C. Mehlig
by L. W. Serrell & Son
attys No. 760,894.

Patented May 24, 1904.

UNITED STATES PATENT OFFICE.

CHARLES F. C. MEHLIG, OF NEW YORK, N. Y.

FLEXIBLE SHAFT-COUPLING.

SPECIFICATION forming part of Letters Patent No. 760,894, dated May 24, 1904.

Application filed August 12, 1902. Serial No. 119,389. (No model.)

*To all whom it may concern:*

Be it known that I, CHARLES F. C. MEHLIG, a citizen of the United States, residing in the borough of Manhattan, city, county, and State of New York, have invented a new and useful Improvement in Flexible Shaft-Couplings, of which the following is a specification.

My invention relates to a flexible shaft or universal-joint coupling adapted for transmitting rotary movement from one rigid power-shaft portion to another shaft portion in line therewith or at any desired inclination thereto.

My invention is applicable for general uses in the arts and manufactures, and is especially adapted for use with dental engines and similar appliances; and the object of my invention is to produce a flexible joint especially for such use superior to the wire helix usually employed and which shall be light in weight, compact in form, and in which there shall be substantially no lost motion or backlash.

In carrying out my invention and as a generic structure I provide between the adjacent ends of the shaft portions a series of spheres and sockets receiving the same, there being axial pins in the spheres and central slots in the sockets receiving the respective ends of the axial pins, the sockets comprising about two hundred and fifty degrees of the circle, and the spheres are free to move in the sockets, guided by the ends of the axial pins, and the bearing of the pins in the slots of the sockets provides for the transmission of motion or power from one shaft portion to the other. I prefer to make the axial pins so as to turn in the spheres and the respective ends thereof of smaller diameter, the slots in the sockets being narrower than the full diameter of the axial pins, thus retaining the axial pins in the spheres and preventing accidental separation. I also prefer to place the axial pins of adjacent spheres at right angles to one another, and thus perceptibly increase the flexibility of the connected parts. The sockets may be formed from a solid block of metal or from a tube, and the sockets may be in pairs, or a socket and sphere may be connected.

In an improved form of my invention I provide the adjacent ends of the shaft portions with spheres of metal having axial pins, and I connect these by companion plates of metal having hemispherical and intervening flat portions set in opposition to one another and which plates are connected through an intermediate block pinned or riveted thereto. These plates are at the respective ends slotted centrally to an appreciable extent to receive the axial pins of the spheres, and the parallel edges of said plates are separated a distance which slightly exceeds the diameter of the necks connecting the spheres and shaft ends. A more complete structure includes spheres of metal on the shaft ends, with series of connected companion plates and pairs of connected spheres. A flexible shaft or joint may be thus made of any desired or required length.

In the drawings, Figures 1, 2, and 3 are elevations representing generic forms of my invention. Fig. 4 is an elevation, and Fig. 5 a longitudinal section and partial elevation, representing a form of my invention. Fig. 6 is an elevation and partial section of a flexible joint of appreciable length and of the form shown in Figs. 4 and 5. Fig. 7 is an elevation of the end of one shaft-coupling and sphere. Fig. 8 represents side and edge elevations of one plate with hemispherical ends. Fig. 9 is an elevation and edge view of the intermediate block placed between said plates, and Fig. 10 is an elevation of a pair of connected spheres.

In the generic structure illustrated in Figs. 1, 2, and 3, $a$ $b$ represent shaft portions. These may be in the form of couplers to be received by and connected to a threaded stem. $c$ $d$ $d^3$ represent the spheres of metal, and $e$ $e^2$ $f$ $f^2$ the sockets receiving the spheres of metal and which sockets are about two hundred and fifty degrees of the circle. 2 3 are the axial pins of the spheres $c$ $d$ $d^3$. In Fig. 1 the spheres $c$ $d$ are shown as integral with the shaft portions $a$ $b$, and the sockets $e$ $f$ are shown as integral and as formed from a block of metal— that is, the sockets may be bored out and the surface turned off, and after the spheres are put in place the edges of the sockets are turned in upon the spheres. In Fig. 2 the sphere $c$ and the shaft portion $a$ are in one and the socket $f^2$ and the shaft portion $b$ in one, while the socket $e^2$ and the sphere $d^3$ are made in one.

In Fig. 3 the spheres $c$ $d$ are shown as formed with the shaft portions $a$ $b$, while the sockets $e$ $f$ are illustrated as spun up from a piece of metal tube and are the equivalents of the sockets, Fig. 1. In Figs. 1, 2, and 3 the axial pins 2 3 are shown as provided with reduced ends received in the slots 7 of the sockets, so that the edges of the sockets bear upon the ends of the pins and the pins are free to turn in the spheres.

$a'$ $b'$ represent shaft portions which are, as illustrated in the drawings, in the form of couplers adapted to receive and be connected to threaded stems. These portions $a'$ $b'$ are provided with integral spheres $c'$ $d'$ of metal and the spheres with the axial pins 2 and 3.

$e'$ $f'$ represent companion plates of metal set in opposition and having hemispherical ends with intervening flat portions 5. A block $g$ is placed between or intermediate of the central portions of the plates $e'$ $f'$, and rivet-pins 12, passing through said plates at the flat portions 5, secure the plates in a fixed and rigid relation to one another. The block $g$ is of slightly greater thickness than the diameter of the neck portion connecting either sphere $c'$ or $d'$ with the shaft portions $a'$ or $b'$. The hemispherical ends when the parts are thus secured engage or embrace the spheres of metal upon opposite sides thereof. These plates $e'$ $f'$ are provided with the central slots 7 of appreciable length, that extend inward from the ends of the plates and in line with one another, and these slots receive the respective ends of the axial pins 2 3.

The power transmitted for the rotary movement is communicated, through the portion $a'$, sphere $c'$, pin 2, plates $e'$ $f'$, to the pin 3, sphere $d'$, and shaft portion $b'$, and at the same time the sphere $c'$ $d'$ can move freely in the hemispherical ends of the plates to the limitations provided by the axial pins 2 3 and can move at an appreciable angle thereto upon the pins 2 3 as pivots, with the necks between the shaft portions and the spheres passing slightly into and through the spaces between the plates $e'$ $f'$, and there is thus provided a freedom of movement for transmitting the rotary motion from one shaft to the other.

$c^2$ $d^2$ represent a pair of integral spheres connected by a neck, and these spheres are provided with axial pins 4.

The axial pins 2, 3, and 4 may be parallel-sided and fit so snugly in the sockets or spheres as to be substantially fixed; but I have shown and prefer to employ pins not only with ends of reduced diameter and free to turn in the sockets or spheres, but with the ends of reduced diameter having flat opposite sides, the flat sides being received within the slots 7 and moving therein. These flat-sided ends in the slots prevent the pins turning in the slots and compel the pins to turn in the spheres and present increased wearing-surfaces at the ends of the pins in contact with the sides of the slots, thus increasing the useful life of the flexible shaft or coupling. The reduced ends of the pins may be round or with opposite flat surfaces. I have shown both forms in the drawings. With the larger diameter of the pin within the spheres and the reduced ends in the slots 7 the hemispherical ends of the sockets and plates bear against the shoulders at the ends of the larger diameter of the pins. Consequently the pins are held in the spheres and cannot become detached.

In Fig. 3 I have shown a series of companion plates having hemispherical ends and a series of the connected spheres $c^2$ $d^2$, the same providing a flexible shaft or joint of greater length than the structures hereinbefore described. These parts may be connected up to any length desired, and I prefer in connecting said parts to place the axial pins 4 of the pair of connected spheres $c^2$ $d^2$ at right angles to one another, as shown in Fig. 6. This has the effect when the parts are connected of reversing the position of each alternate pair of companion plates with hemispherical ends, and so increasing the flexibility of the shaft-coupling to the maximum. As there is no longitudinal strain upon the parts of said coupling or flexible joint, it is not necessary that the sockets or hemispherical ends should extend over and embrace the spheres to any greater extent than illustrated in the drawings—namely, about two hundred and fifty degrees of the circle—and the structure could be built with even a less extent of surface to the sockets or hemispherical ends than has been shown, as the strain in use is around the shaft in the direction of rotation and not longitudinally thereof.

This improvement is adapted as a device for transmitting rotary motion from a source of power to a place of use when the parts are in line or at any moderate inclination and is applicable in the arts and manufactures for general use, but especially applicable for use in connection with dental engines and similar appliances where light work and high speed are the features sought to be obtained.

I claim as my invention—

1. In a flexible shaft or coupling, the combination with adjacent ends, of a series of sockets and spheres engaged thereby and extending between the shaft ends, said sockets having central notches from their edges inward at opposite sides and axial pins passing freely through the spheres and having ends of reduced diameter and free to turn in the spheres and the ends of reduced diameter received in the notches of the sockets and the sockets comprising about two hundred and fifty degrees of the circle, substantially as set forth.

2. In a flexible shaft or coupling, the combination with adjacent shaft portions and connected spheres of metal, of companion plates having hemispherical ends slotted and set in opposition and said ends embracing said spheres, means for securing said plates in a fixed relation and at a predetermined distance apart and axial pins passing through said spheres with ends of reduced diameter received in slots of said companion plates, substantially as set forth.

3. In a flexible shaft or coupling, the combination with adjacent shaft portions and connected spheres of metal, of companion plates having hemispherical ends slotted and set in opposition and said ends embracing said spheres, means for securing said plates in a fixed relation and at a predetermined distance apart and axial pins passing through said spheres with ends of reduced diameter received in slots of said companion plates, said ends of reduced diameter having flat opposite faces adapted to bear against the opposite faces of the slots to prolong the useful life of the parts, substantially as set forth.

4. A flexible shaft-coupling comprising adjacent shaft portions, spheres of metal connected thereto by intervening necks, companion plates having hemispherical ends centrally and longitudinally slotted for an appreciable distance from their ends inward with intervening flat portions, set in opposition to one another and embracing the respective spheres, an intermediate block and pins passing through said block and the flat faces of said companion plates to secure said plates in a fixed relation to one another, and axial pins in said spheres with the ends thereof in the slots of the companion plates, substantially as set forth.

5. A flexible shaft-coupling comprising adjacent shaft portions, spheres of metal connected thereto by intervening necks, companion plates having hemispherical ends centrally and longitudinally slotted for an appreciable distance from the ends inward with intervening flat portions set in opposition to one another and embracing the respective spheres, an intermediate block and pins passing through said block and the flat faces of said companion plates to secure said plates in a fixed relation to one another and axial pins with reduced ends having opposite flattened faces in said spheres with the reduced ends received in the slots of said companion plates and said companion plates spaced apart a distance slightly exceeding the diameter of the necks connecting the spheres to the shaft portions, substantially as set forth.

6. In a flexible shaft-coupling, the combination with shaft portions and spheres of metal connected thereto, of a series of pairs of companion plates with hemispherical ends longitudinally slotted from opposite ends and having means connecting said pairs of plates in a fixed relation to one another and series of intermediate pairs of connected spheres and axial pins with ends of reduced diameter passing through the spheres and the ends having opposite flattened faces, with the ends of the pins passing through the slots of the pairs of plates and the axial pins of the respective pairs of connected spheres set at right angles to one another so as to change the position of the alternate pairs of companion plates with hemispherical ends, substantially as set forth.

Signed by me this 7th day of August, 1902.

C. F. C. MEHLIG.

Witnesses:
Geo. T. Pinckney,
Bertha M. Allen.